No. 655,408. Patented Aug. 7, 1900.
M. H. MADSEN.
CORN HUSKING MACHINE.
(Application filed Dec. 22, 1899.)
(No Model.) 2 Sheets—Sheet 1.
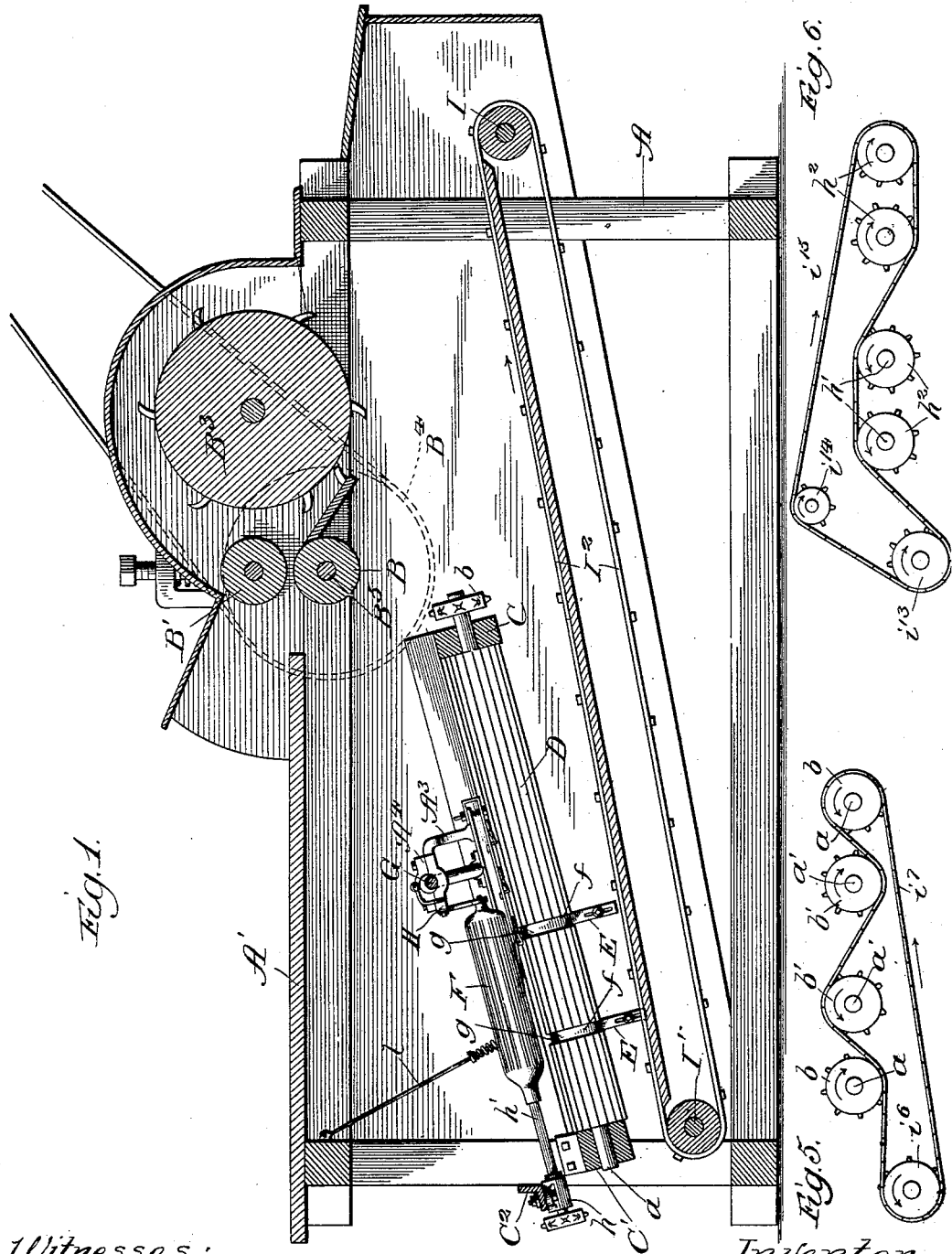
Witnesses:
D. H. Lee.
T. J. Martin.
Inventor
Mads H. Madsen,
By Dyrenforth and Dyrenforth,
Att'ys.

No. 655,408. Patented Aug. 7, 1900.
M. H. MADSEN.
CORN HUSKING MACHINE.
(Application filed Dec. 22, 1899.)
(No Model.) 2 Sheets—Sheet 2.
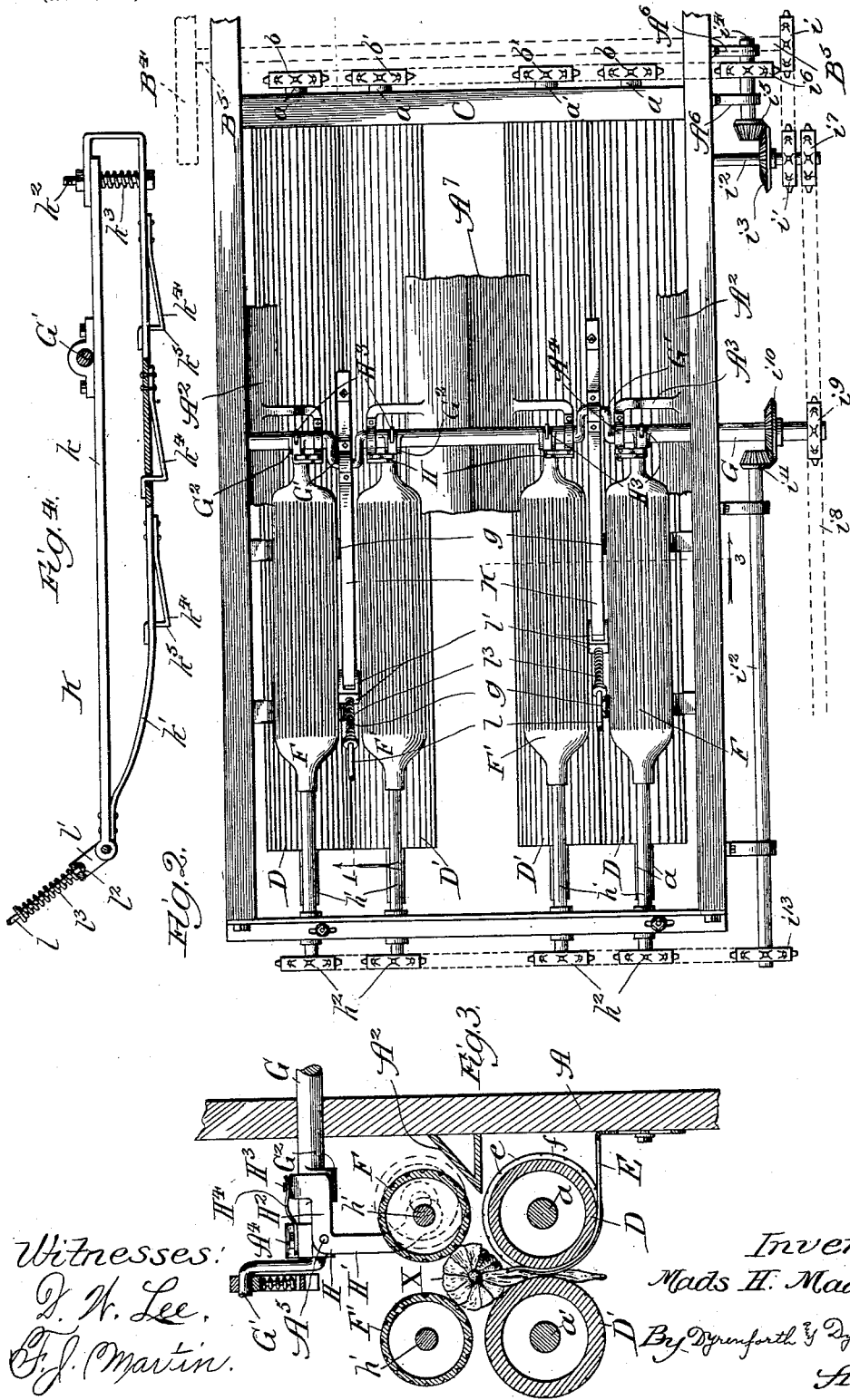
Witnesses:
D. W. Lee.
F. J. Martin.
Inventor:
Mads H. Madsen,
By Dyrenforth & Dyrenforth
Attys.
THE NORRIS PETERS CO., PHOTO-LITHO., WASHINGTON, D. C.

UNITED STATES PATENT OFFICE.

MADS H. MADSEN, OF KIMBALLTON, IOWA.

CORN-HUSKING MACHINE.

SPECIFICATION forming part of Letters Patent No. 655,408, dated August 7, 1900.

Application filed December 22, 1899. Serial No. 741,260. (No model.)

*To all whom it may concern:*

Be it known that I, MADS H. MADSEN, a citizen of the United States, residing at Kimballton, in the county of Audubon and State of Iowa, have invented a new and useful Improvement in Corn-Husking Machines, of which the following is a specification.

My invention relates to corn-husking machines of the class in which the ears of corn move longitudinally along coöperating parallel rotating husking-rollers which remove the husks and silk from the ears.

My object is to provide certain improvements in the construction of machines of this class with a view to insuring proper feed of the ears along the husking-rollers and thorough stripping off of the husks and silk without danger of injury to or loosening of the kernels of corn and to causing the ears to move rapidly through the machine, whereby the husking operation will be speedily performed and the capacity of the machine increased.

Referring to the drawings, Figure 1 is a longitudinal section of a machine for shredding cornstalks and separating and husking the ears provided with my improved husking mechanism, the section being taken on line 1 of Fig. 2, on a reduced scale; Fig. 2, an enlarged and partly-broken plan view of my improved husking mechanism; Fig. 3, a broken section through one set of husking-rollers, the section being taken on line 3 in Fig. 2 and viewed in the direction of the arrow; Fig. 4, an enlarged sectional detail view of a vertically-oscillating and longitudinally-reciprocating ear-feeder; and Figs. 5 and 6, diagrammatic views illustrating the gearing and direction of rotation of the lower and upper rollers, respectively.

A is the main frame of the machine, surmounted by a platform A'.

B B' are respectively the lower and upper feed-rollers for the cornstalks, beyond which is the shredding-cylinder B³. The feed-rollers and shredder shown form no part of my present invention, and any mechanism for performing the same operation or for simply separating the ears from the cornstalks may be substituted therefor. In fact, as my improvements relate merely to the mechanism for husking the ears it is not to be limited to use with shredding mechanism or to any particular means for feeding the ears to be husked into the machine.

In the construction shown the machine is driven from a pulley B⁴ on the shaft B⁵, which carries the lower feed-roller B. Extending across the frame A in the position shown is a bar C.

C' is an end bar fastened at opposite ends to the legs of the frame A.

D D' are husking-rollers upon shafts $a$ $a'$, journaled at opposite ends in the bars C C', respectively. On the shaft $a$, beyond the bar C, is a sprocket-wheel $b$, and on the shaft $a'$ a sprocket-wheel $b'$. As shown in the figures, there are two pairs of husking-rollers, which give to the machine the character of a double machine, the rollers D being the outer members, and the rollers D' the inner members, of the pairs. The surfaces of the husking-rollers are roughened, the roughening being produced, preferably, by shallow longitudinal recesses or grooves $e$, which are shown somewhat exaggerated in Fig. 3. Each roller D is provided in the positions shown with circumferential grooves or recesses $f$, and adjustably secured to the sides of the frame A are stripping-fingers E, which extend part way around the rollers D in the recesses $f$, terminating just beyond the bite of the rollers. The ends of the stripping-fingers E are turned outward, as indicated in Fig. 3, and preferably pointed, as indicated at $g$ in Figs. 1 and 2. The fingers E are formed, preferably, of rather thin springy metal, for a purpose hereinafter described. Fastened to the rear end of the frame A is a cross-bar C², provided on its under side with bearings $h$ for shafts $h'$, carrying ear-turning rollers F F', having roughened surfaces like the rollers D D'. The shafts $h'$ are above and correspond in number with the shafts of the rollers D D', and the bearings $h$ are pivotally fastened to the bar C², whereby they may turn thereon to a slight extent. On the sides of the frame A, just above the plane of the rollers D D', are deflecting-plates A², inclined, as shown most plainly in Fig. 3. On the plates A² are upward and inward extending bearing-arms A³, provided at their tops with bearing-boxes A⁴ for a cross-extending crank-shaft G, which also has bearings in the sides of the frame A.

The shaft G is provided with two cranks G', extending, preferably, in opposite directions and in the positions shown.

H H are bell-crank levers fulcrumed upon pins $A^5$ on the arms $A^3$ and having downwardly-extending arms H', forming bearings for the ends of the shafts $h'$, which carry the rollers F. The arms $H^2$ of the bell-crank levers are bent over the shaft G and provided with antifriction-rollers $H^3$, which ride upon cams $G^2$, carried by the shaft. Springs $H^4$, fastened upon the boxes $A^4$, bear upon the arms $H^2$ to press them normally in the direction of the shaft G. As will be seen in the drawings, all the rollers F F' are similarly mounted in bell-crank levers which are swung upon pivots by means of cams $G^2$ on the shaft G in the direction away from each other against the resistance of the springs $H^4$ and in the direction toward each other by gravity and the slight resilience of the springs $H^4$. Journaled in the frame in the position shown are shafts I I', provided with rollers carrying an endless discharge-belt $I^2$, movable in the direction of the arrow in Fig. 1 from beneath the husking mechanism to a point beyond the opposite end of the frame A. The driveshaft $B^5$ carries a sprocket-wheel $i$, geared by a drive-chain to a sprocket-wheel $i'$ on a rotary stub-shaft $i^2$, which also carries a beveled gear-wheel $i^3$. Mounted in bearings $A^6$ on the side of the frame A, Fig. 2, is a short shaft $i^4$, carrying a beveled pinion $i^5$, geared to the beveled gear-wheel $i^3$, and carrying between the bearings $A^6$ a sprocket-wheel $i^6$. Passing over the sprocket-wheels $i^6$ $b$ $b'$, as shown in Fig. 5, is a drive-chain $i^7$, operating to turn the said sprocket-wheels in the direction of the arrows, whereby the rollers D D' of each pair rotate toward each other. On the stub-shaft $i^2$ is a sprocket-wheel $i^7$, geared by a chain $i^8$ to a sprocket-wheel $i^9$ on the shaft G to rotate the latter. The shaft G carries a beveled gear-wheel $i^{10}$, meshing with a beveled pinion $i^{11}$ on a shaft $i^{12}$, carrying a sprocket-wheel $i^{13}$ in the plane of the sprocket-wheels $h^2$ on the shafts $h'$ of the ear-turning rollers F F'. Extending over the sprocket-wheels $i^{13}$ $h^2$ and over an idle sprocket-wheel $i^{14}$ is a drive-chain $i^{15}$, which turns the sprocket-wheels $h^2$, and consequently each pair of rollers F F', in the same direction, as indicated by the arrows in Fig. 6.

K K are ear-feeding frames working between the rollers F F'. Each frame is formed of a longitudinally-extending bar $k$, pivotally mounted toward one end upon the respective crank G' of the shaft G. At its opposite end each bar is pivotally connected with a rod $l$, fastened pivotally at its upper end to the frame A. The connections between the rods $l$ and bars $k$ are formed by heads $l'$, which may slide upon the rods $l$ to end stops $l^2$ and are held against said stops by confined springs $l^3$, against the resistance of which they are movable from the stops. Fastened at one end to the under side of the bar $k$, adjacent to the head $l'$, is a springy bar $k'$. The bar $k'$ is bent at its opposite end over the adjacent end of the bar $k$, as shown in Fig. 4, a bolt $k^2$ passing through the bars, as shown, with a confined spring $k^3$ thereon, which tends normally to press the bar $k'$ in the downward direction. On the bar $k'$ are ear-engagers comprising spring-teeth $k^4$, each consisting of a flat spring fastened at one end to the said bar, shaped between its ends with a sharp corner $k^5$ and passing at its free end upward through an opening in the bar $k'$ and there bent over to form a stop which limits the downward movement of the tooth. It will be understood that the teeth $k^4$ may yield in the upward direction to a slight extent with relation to the bar $k'$. The latter may yield upward with relation to the bar $k$, and the bar $k$ may yield upward with relation to the rod $l$ and frame A.

In operation as the ears of corn are broken off by the rollers B B' they fall upon the upper end portions of the rollers D D', being deflected to the bites of the same by the side deflecting-plates $A^2$ and central V-shaped deflector $A^7$. Owing to the inclination of the rollers D D', the tendency of the ears will be to straighten themselves longitudinally with the rollers and move longitudinally down the inclined plane of the rollers. As the ears move toward the plane of the shaft G they are engaged by the feeding-frames K, which are raised by the cranks G' and swung first backward and upward and then downward and forward, causing the teeth $k^4$ to engage and slide the ears forward and press them gently into the bites of the rollers D D'. As the ears move beneath the turning-rollers F F' they are also engaged by the pointed ends of the stripping-fingers E, against which they are rotated by the rollers F F' to loosen the husks and silk. As the husks and silk are loosened they are engaged by the rollers D D' and drawn downward between the latter to strip them from the ears. In the movement of the ears toward the lower ends of the rollers F F' by the action of the feeders K the ears are given one or more complete turns, which insures complete stripping therefrom of the husks and silk. The relations of the cranks G' and cams $G^2$ are such that with each feed movement of the frames K the rollers F F' are swung away from each other to disengage the ears and permit them to slide freely, while in each upward and backward movement of the frames K the rollers F F' are pressed in the direction of each other against opposite sides of the ears X to turning engagement therewith. The husks and silk torn from the ears are deposited by the rollers D D' upon the traveling belt $I^2$ and discharged from the machine at one end, while the husked ears are discharged from the lower ends of the rollers D D' beyond the lower end of the belt $I^2$.

As before stated, during the engagement of the intermittently-operating feed-frames K with the ears X the latter are released by the intermittently-operating turning-rollers F F' and move easily under the yielding engagement of the teeth $k^4$. The yielding nature of the frame K and teeth causes the latter to engage gently with the ears in a manner which will not injure the kernels beneath the husks. The spring stripping-fingers E are of a stiffness which will cause their points to penetrate the husks and silk without engaging the kernels with such force as to injure or loosen them. The fingers E at their points will yield to a limited extent in and out of the grooves or recesses $f$, so that they will extend farther outward to engage ears of larger diameter and be pressed farther into the grooves under engagement with ears of smaller diameter. Thus, while my improved husking-machine insures clean stripping of the husks and silk from the ears, it will not injure or loosen the kernels. The frame K insures a positive and quick forward feeding of the ears and prevents danger of their overriding each other and clogging the machine. The quick passage of the ears thus brought about greatly increases the capacity of the machine.

While I prefer to construct my improvements throughout as shown and described, they may be variously modified in the matter of details without departing from the spirit of my invention as defined by the claims.

What I claim as new, and desire to secure by Letters Patent, is—

1. In a corn-husking machine, the combination with a pair of oppositely-rotating husking-rollers, of a pair of roughened coöperating ear-turning rollers, above the husking-rollers, rotating in the same direction and operating to engage the ears simultaneously at opposite sides.

2. In a corn-husking machine, the combination with a pair of oppositely-rotating husking-rollers, of a pair of coöperating ear-turning rollers, above the husking-rollers, rotating in the same direction and operating to engage the ears simultaneously at opposite sides, and an ear-feeder movable between the turning-rollers to engage and advance the ears longitudinally along the husking-rollers.

3. In a corn-husking machine, the combination with the husking-rollers, of turning mechanism for the ears operating to bear intermittingly against and rotate the ears, and means for advancing the ears between the said turning mechanism and husking-rollers, substantially as described.

4. In a corn-husking machine, the combination with the husking-rollers of intermittently-operating turning mechanism for the ears and an intermittent ear-feeder operating alternately with said turning mechanism to advance the ears along the husking-rollers, substantially as described.

5. In a corn-husking machine, the combination with the husking-rollers, of a pair of coacting ear-turning rollers above the husking-rollers, operating to bear intermittingly against the ears and turn the same, and an ear-feeder operating alternately with said turning-rollers to advance the ears along the husking-rollers, substantially as described.

6. In a corn-husking machine, the combination with the husking-rollers, of a pair of coacting ear-turning rollers above the husking-rollers operating to bear intermittingly against the ears and turn the same, and a gyrating ear-feeder operating alternately with said turning-rollers to advance the ears along the husking-rollers, substantially as described.

7. In a corn-husking machine, the combination with the husking-rollers, of a pair of ear-turning rollers above the husking-rollers, means for moving the turning-rollers alternately into and out of turning engagement with the ears, and feed mechanism alternating with the operation of the turning-rollers to engage and advance the ears, substantially as described.

8. The combination with the inclined parallel husking-rollers and ear-turning rollers of an ear-feeding frame between the turning-rollers pivotally mounted at one end upon a swinging support, above the lower end portion of said rollers, and mounted toward its opposite end upon a crank to rotate in the vertical plane, an ear-engager on the frame adjacent to the crank operating, during the movement of the frame, in the direction of the lower ends of said rollers, to engage, advance and then release the ears.

9. The combination with the inclined parallel husking-rollers and ear-turning rollers of an ear-feeding frame between the turning-rollers pivotally mounted at one end upon a swinging support, above the lower end portion of said rollers, and mounted toward its opposite end upon a crank to rotate in the vertical plane, and yielding ear-engaging teeth on the frame adjacent to the crank operating, during the movement of the frame, in the direction of the lower ends of said rollers, to engage, advance and then release the ears.

10. The combination with the inclined parallel husking-rollers and ear-turning rollers of an ear-feeder comprising a resilient frame between the turning-rollers pivotally mounted at one end upon a swinging support, above the lower end portion of said rollers, and mounted toward its opposite end upon a crank to rotate in the vertical plane, and yielding ear-engaging teeth on the frame adjacent to the crank operating, during the movement of the frame, in the direction of the lower ends of said rollers, to engage, advance and then release the ears.

11. In a corn-husking machine, the combination with a pair of coöperating husking-rollers of a pair of ear-turning rollers above the husking-rollers, movable supports in which the turning-rollers are journaled toward one end, means for moving the supports to move the turning-rollers alternately toward and away from each other and means for rotating the turning-rollers in the same direction, substantially as described.

12. In a corn-husking machine, the combination with a pair of coöperating husking-rollers of a pair of ear-turning rollers above the husking-rollers, movable supports in which the turning-rollers are journaled toward one end, means for moving the supports to move the turning-rollers alternately toward and away from each other, comprising a rotary shaft, and cams on the shaft engaging the supports, and means for rotating the turning-rollers in the same direction, substantially as described.

13. In a corn-husking machine, the combination with the husking-rollers, of a pair of ear-turning rollers above the husking-rollers, swinging supports, in which the turning-rollers are journaled at one end, a crank-shaft provided with cams engaging said supports to swing the turning-rollers alternately toward and away from each other, and a gyratory ear-feeder operatively connected with the crank-shaft to move between the turning-rollers, substantially as described.

14. In a corn-husking machine, the combination with the husking-rollers and means for turning the ears thereon, of a stationary ear-engaging stripping-finger extending at its end beyond the bite of the corn-husking rollers, substantially as described.

15. In a corn-husking machine, the combination with the frame of a pair of ear-husking rollers one of which is provided with a circumferential groove, a stationary ear-engaging stripping-finger fastened to the frame and extending in said groove and having a yielding end portion beyond the bite of the husking-rollers and movable into and out of said groove, and means for turning the ears against the stripping-finger, substantially as and for the purpose set forth.

16. In a corn-husking machine, the combination with the frame of a pair of ear-husking rollers, one of which is provided with a circumferential groove, a stationary stripping-finger fastened to the frame and extending between the husking-rollers in said groove and having a yielding end portion close to the bite of the husking-rollers, a pair of ear-turning rollers with means for moving them toward and away from each other, and a gyratory ear-feeder alternating in its operation with the turning-rollers, substantially as described.

MADS H. MADSEN.

In presence of—
  J. W. DYRENFORTH,
  M. S. MACKENZIE.